US011458563B2

(12) United States Patent
Wenning et al.

(10) Patent No.: US 11,458,563 B2
(45) Date of Patent: Oct. 4, 2022

(54) REFILL FRICTION STIR SPOT WELDING TOOL AND END EFFECTOR

(71) Applicant: Lincoln Global, Inc., Santa Fe Springs, CA (US)

(72) Inventors: Nathan P. Wenning, Coldwater, OH (US); John A. Will, Coldwater, OH (US); James R. Schwieterman, Willshire, OH (US); Austin J. Ebbing, Coldwater, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 0 days.

(21) Appl. No.: 16/993,414

(22) Filed: Aug. 14, 2020

(65) Prior Publication Data

US 2022/0048131 A1 Feb. 17, 2022

(51) Int. Cl.
*B23K 20/00* (2006.01)
*B23K 20/12* (2006.01)

(52) U.S. Cl.
CPC ...... *B23K 20/1255* (2013.01); *B23K 20/1265* (2013.01); *B23K 20/127* (2013.01)

(58) Field of Classification Search
CPC . B23K 20/1255; B23K 20/122; B23K 20/123
See application file for complete search history.

(56) References Cited

U.S. PATENT DOCUMENTS

| 3,083,042 A | 3/1963 | Collar |
| 3,252,721 A | 5/1966 | Weasler |
| 3,480,310 A | 11/1969 | McElwain |

(Continued)

FOREIGN PATENT DOCUMENTS

| CN | 208663006 U | 3/2019 |
| WO | 011/080157 A1 | 7/2011 |

(Continued)

OTHER PUBLICATIONS

Coldwater Machine Company; "Refill Friction Stir Spot Welding Quick Change Tooling;" https://www.youtube.com/watch?v=-Ng2t7ekyPM; Dated Mar. 21, 2016; pp. 1-8.

(Continued)

*Primary Examiner* — Erin B Saad
(74) *Attorney, Agent, or Firm* — Brad C. Spencer

(57) ABSTRACT

A quick connect refill friction stir spot welding tool includes a clamp having a first radially-projecting mounting tab configured for engaging a first mounting slot in a refill friction stir spot welding weld head. A friction sleeve is located coaxially within the clamp and has a second radially-projecting mounting tab configured for engaging a second mounting slot in the refill friction stir spot welding weld head. The second radially-projecting mounting tab is located higher along an axis of the tool than the first radially-projecting mounting tab, and radially inward thereof. A friction pin is located coaxially within the clamp and friction sleeve. The clamp and friction sleeve are attachable to and detachable from the refill friction stir spot welding weld head by rotations through less than 360 degrees.

21 Claims, 7 Drawing Sheets

(56) References Cited

U.S. PATENT DOCUMENTS

| | | | |
|---|---|---|---|
| 3,529,842 A * | 9/1970 | Benjamin | B23B 31/1071 |
| | | | 279/30 |
| 3,698,420 A * | 10/1972 | Grundy | F16K 31/528 |
| | | | 137/329.06 |
| 4,392,759 A | 7/1983 | Cook | |
| 4,906,123 A | 3/1990 | Weskamp et al. | |
| 7,278,640 B2 | 10/2007 | Allan et al. | |
| 7,421,886 B1 | 9/2008 | Fox et al. | |
| 8,500,358 B1 | 8/2013 | Cassidy | |
| 10,183,357 B2 | 1/2019 | Weigl | |
| 2006/0185314 A1 | 8/2006 | Sack | |
| 2009/0241301 A1 | 10/2009 | Hunt et al. | |
| 2014/0097582 A1 | 4/2014 | Wang | |
| 2015/0143686 A1* | 5/2015 | Blacket | B21J 15/26 |
| | | | 29/525.06 |
| 2018/0009113 A1 | 1/2018 | Lauder et al. | |
| 2018/0094646 A1* | 4/2018 | Taylor | B23P 15/006 |
| 2019/0151982 A1* | 5/2019 | Rosal | B23K 20/1255 |

FOREIGN PATENT DOCUMENTS

| | | |
|---|---|---|
| WO | 2017/102953 A1 | 6/2017 |
| WO | 2017/211554 A1 | 12/2017 |

OTHER PUBLICATIONS

ESAB; "ESAB's Versotrac EWT 1000 Tractor Features Modular Design, Tool-Less Assembly For Portable Welding Applications;" Dated Nov. 6, 2018; pp. 1-2.

* cited by examiner

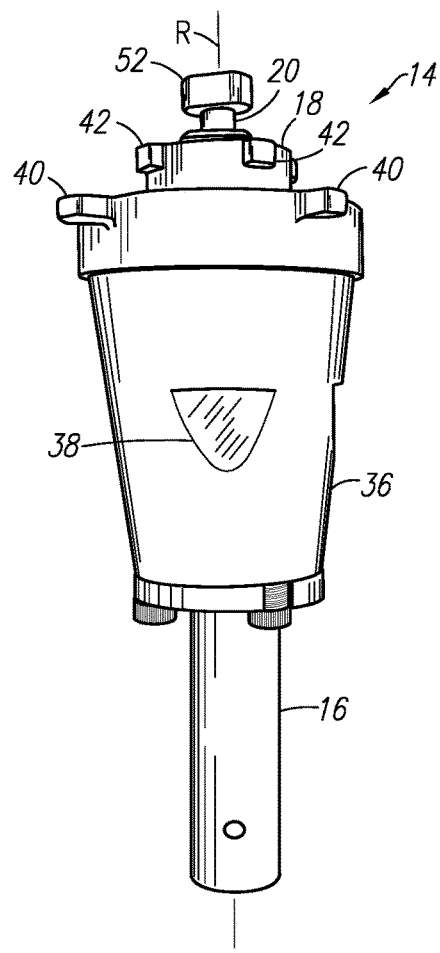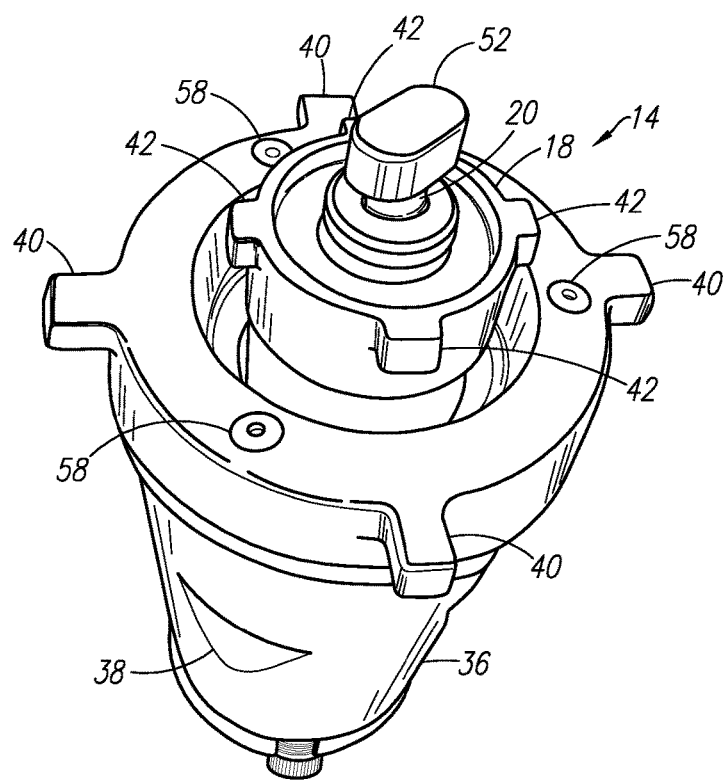
FIG. 3
FIG. 4

REFILL FRICTION STIR SPOT WELDING TOOL AND END EFFECTOR

BACKGROUND OF THE INVENTION

Field of the Invention

The present invention relates to refill friction stir spot welding devices, and in particular to robotic refill friction stir spot welding tools and end effectors.

Description of Related Art

Refill friction stir spot welding is a solid state joining process. It can be used to weld two or more overlapping metal workpieces. In refill friction stir spot welding, a sleeve and a pin within the sleeve are pressed against one of the workpieces and rotated to heat the workpieces. The workpiece material achieves a plastic state from heat and pressure. The sleeve is pushed into the workpiece while the pin is retracted away from the workpiece, which causes a displacement of the plastic workpiece material within the sleeve. The sleeve and pin are then returned to their initial flush condition to force the displaced material back toward the workpieces, thereby forming a generally flush spot weld. Refill friction stir spot welding devices can be mounted to robot arms (e.g., a 6-axis robot arm) and gantry-style welding tables for automated spot welding, and also pedestal-style machines.

Over time, refill friction stir spot welding tools can become clogged, worn, etc. so that they require periodic replacement. Replacing refill friction stir spot welding tools is typically labor-intensive and time-consuming, and, thus, can be expensive and lead to undesirable down time. It would be desirable to minimize the time required to replace refill friction stir spot welding tools in a refill friction stir spot welding device.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a quick connect refill friction stir spot welding tool. The tool includes a clamp comprising a first radially-projecting mounting tab configured for engaging a first mounting slot in a refill friction stir spot welding weld head. A friction sleeve is located coaxially within the clamp and comprises a second radially-projecting mounting tab configured for engaging a second mounting slot in the refill friction stir spot welding weld head. The second radially-projecting mounting tab is located higher along an axis of the tool than the first radially-projecting mounting tab, and radially inward thereof. A friction pin is located coaxially within the clamp and friction sleeve. The clamp is attachable to and detachable from the refill friction stir spot welding weld head by rotations of the clamp through less than 360 degrees. The friction sleeve is attachable to and detachable from the refill friction stir spot welding weld head by rotations of the friction sleeve through less than 360 degrees.

In accordance with another aspect of the present invention, provided is a quick connect robotic refill friction stir spot welding tool. The tool includes a clamp comprising a first plurality of radially-projecting mounting tabs configured for engaging clamp mounting slots in a clamp receiver of a refill friction stir spot welding end effector. A friction sleeve is located coaxially within the clamp and comprises a second plurality of radially-projecting mounting tabs configured for engaging friction sleeve mounting slots in a spindle of the refill friction stir spot welding end effector. The second plurality of radially-projecting mounting tabs are located at a different axial location along an axis of the tool than the first plurality of radially-projecting mounting tabs, and radially inward thereof. A friction pin is located coaxially within the clamp and friction sleeve and comprises a stadium-shaped mounting head receivable by the spindle of the refill friction stir spot welding end effector. The clamp is attachable to and detachable from the refill friction stir spot welding end effector by rotations of the clamp relative to clamp receiver through less than 180 degrees. The friction sleeve and friction pin are attachable to and detachable from the refill friction stir spot welding end effector by rotations of the friction sleeve and friction pin relative to the spindle through less than 180 degrees.

In accordance with another aspect of the present invention, provided is a refill friction stir spot welding end effector for a robot arm. The end effector comprises a spindle and a clamp receiver mounted coaxially with the spindle. The end effector includes a clamp comprising a first radially-projecting mounting tab that engages a clamp mounting slot in the clamp receiver. A friction sleeve is located within the clamp and comprises a second radially-projecting mounting tab that engages a friction sleeve mounting slot in the spindle. The second radially-projecting mounting tab is located at a different axial location along a rotational axis of the spindle than the first radially-projecting mounting tab, and radially inward thereof. A friction pin is located within the friction sleeve and attached to the spindle. An anvil arm supports an anvil that is aligned with the clamp, the friction sleeve, and the friction pin along the rotational axis of the spindle. The friction sleeve and the friction pin are operatively coupled to the spindle for rotation by the spindle. The friction sleeve and the friction pin are independently linearly movable along the rotational axis of the spindle during a refill friction stir spot welding operation. The clamp is attachable to and detachable from the clamp receiver by rotations of the clamp relative to the clamp receiver through less than 180 degrees, and the friction sleeve and friction pin are attachable to and detachable from the spindle by rotations of the friction sleeve and friction pin relative to the spindle through less than 180 degrees.

In accordance with another aspect of the present invention, provided is a kit for a quick connect refill friction stir spot welding tool. The kit includes a clamp comprising a first radially-projecting mounting tab configured for engaging a first mounting slot in a refill friction stir spot welding weld head. The kit includes a friction sleeve configured for emplacement coaxially within the clamp and comprising a second radially-projecting mounting tab configured for engaging a second mounting slot in the refill friction stir spot welding weld head. The second radially-projecting mounting tab is locatable at a different axial location along an axis of the tool than the first radially-projecting mounting tab, and radially inward thereof, when the friction sleeve is emplaced within the clamp. The kit includes a friction pin configured for emplacement coaxially within the clamp and friction sleeve. The clamp is attachable to and detachable from the refill friction stir spot welding weld head by rotations of the clamp through less than 360 degrees, and the friction sleeve is attachable to and detachable from the refill friction stir spot welding weld head by rotations of the friction sleeve through less than 360 degrees.

BRIEF DESCRIPTION OF THE DRAWINGS

The foregoing and other aspects of the invention will become apparent to those skilled in the art to which the invention relates upon reading the following description with reference to the accompanying drawings, in which:

FIG. 3 shows a refill friction stir spot welding tool;

FIG. 4 shows the refill friction stir spot welding tool;

DETAILED DESCRIPTION OF THE INVENTION

Figure 1:
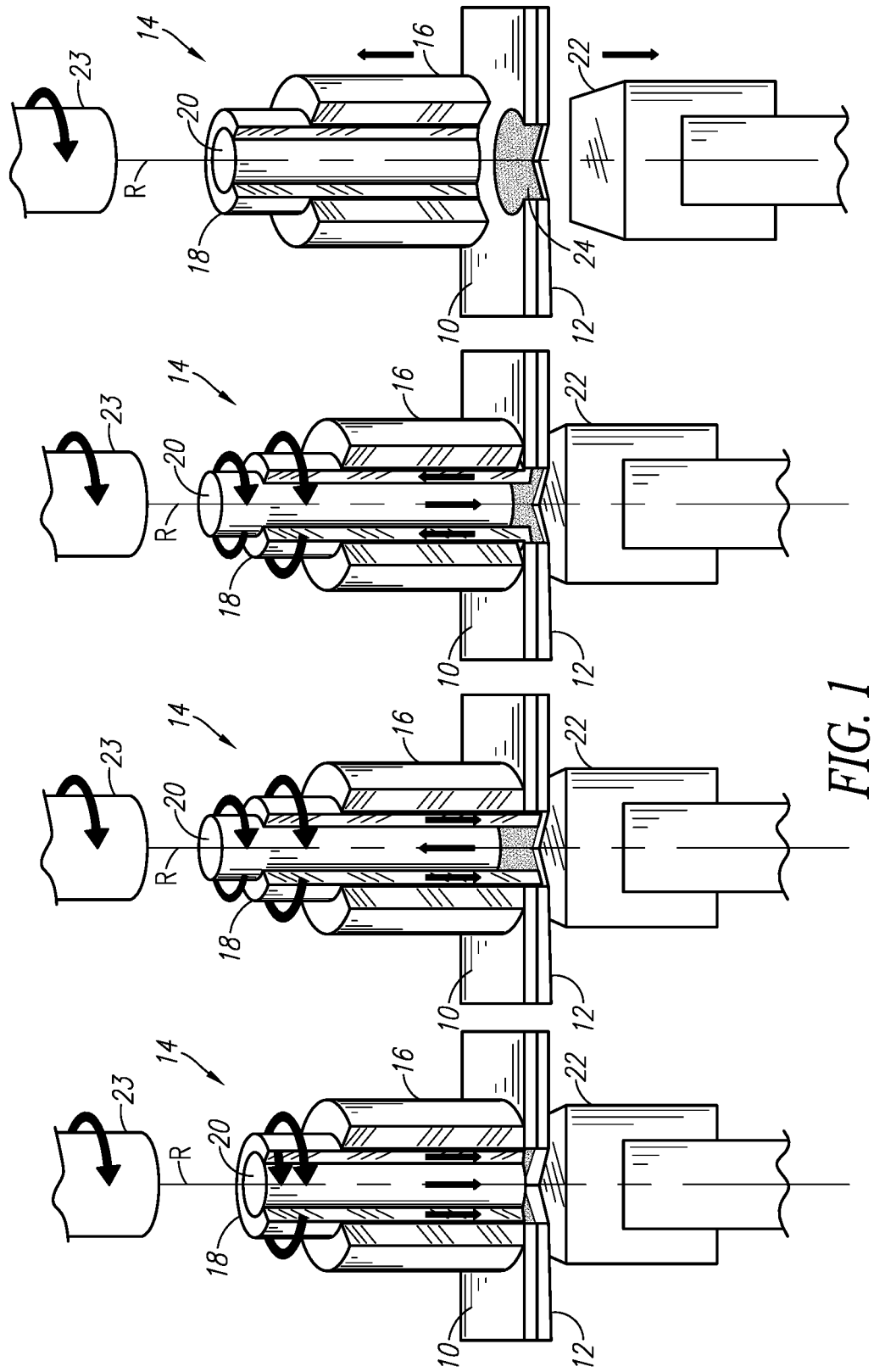
FIG. 1 illustrates an example refill friction stir spot welding process.

The present invention relates to refill friction stir spot welding devices, such as robotic refill friction stir spot welding tools and end effectors. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

FIG. 1 schematically shows a refill friction stir spot welding process. Refill friction stir spot welding is a solid state joining process. The workpieces 10, 12 do not melt during welding, but are heated to a plastic state. A tool 14 that performs the spot weld includes a non-rotating clamp 16, a rotating friction sleeve 18, and a rotating friction pin 20. The workpieces 10, 12 to be spot welded are clamped between the tool 14 and a support base or anvil 22. Pressure is applied to the clamped workpieces 10, 12 and the workpieces are locally heated by the friction sleeve 18 and friction pin 20 rotating within the clamp 16. A spindle 23 that is coupled to the friction sleeve 18 and friction pin 20 rotates the sleeve and pin about a rotational axis R of the spindle. The tool 14 locally heats the workpieces 10, 12 to a plastic state. The friction sleeve 18 is then pushed into the workpieces 10, 12 to a desired depth within the lower workpiece 12, while the friction pin 20 is retracted away from the workpieces. The spindle 23 has separate axially-movable portions that drive the friction sleeve 18 and friction pin 20 to rotate and translate axially. Material from the workpieces 10, 12 is displaced upward into the volume created by the movement of the friction sleeve 18 and the friction pin 20. The plastic material from the workpieces 10, 12 is stirred together, and the friction sleeve 18 and friction pin 20 are returned to their initial flush condition to force the displaced plastic material back toward the workpieces, thereby forming a generally flush spot weld 24. The tool 14 and anvil 22 are then separated, while the workpieces 10, 12 remain joined by the spot weld 24. The refill friction stir spot welding process is quick, e.g., less than 2 seconds (depending on the thickness of the workpieces). Although the friction sleeve 18 is shown as being pushed into the workpieces 10, 12 and the friction pin 20 retracted, it is to be appreciated that the friction pin can alternatively be pushed into the workpieces and the friction sleeve retracted during the refill friction stir spot welding process.

As noted above, refill friction stir spot welding tools can become clogged, worn, etc. over time and must be replaced. Replacing refill friction stir spot welding tools is labor-intensive and time-consuming, and, thus, can be expensive and can lead to undesirable down time. Conventional refill friction stir spot welding tools are held in place by various separate fasteners (e.g., bolts, union nuts, etc.) that must be removed and remounted to replace the tool. It can typically take as long as 20 minutes to replace conventional refill friction stir spot welding tools.

Figure 2:
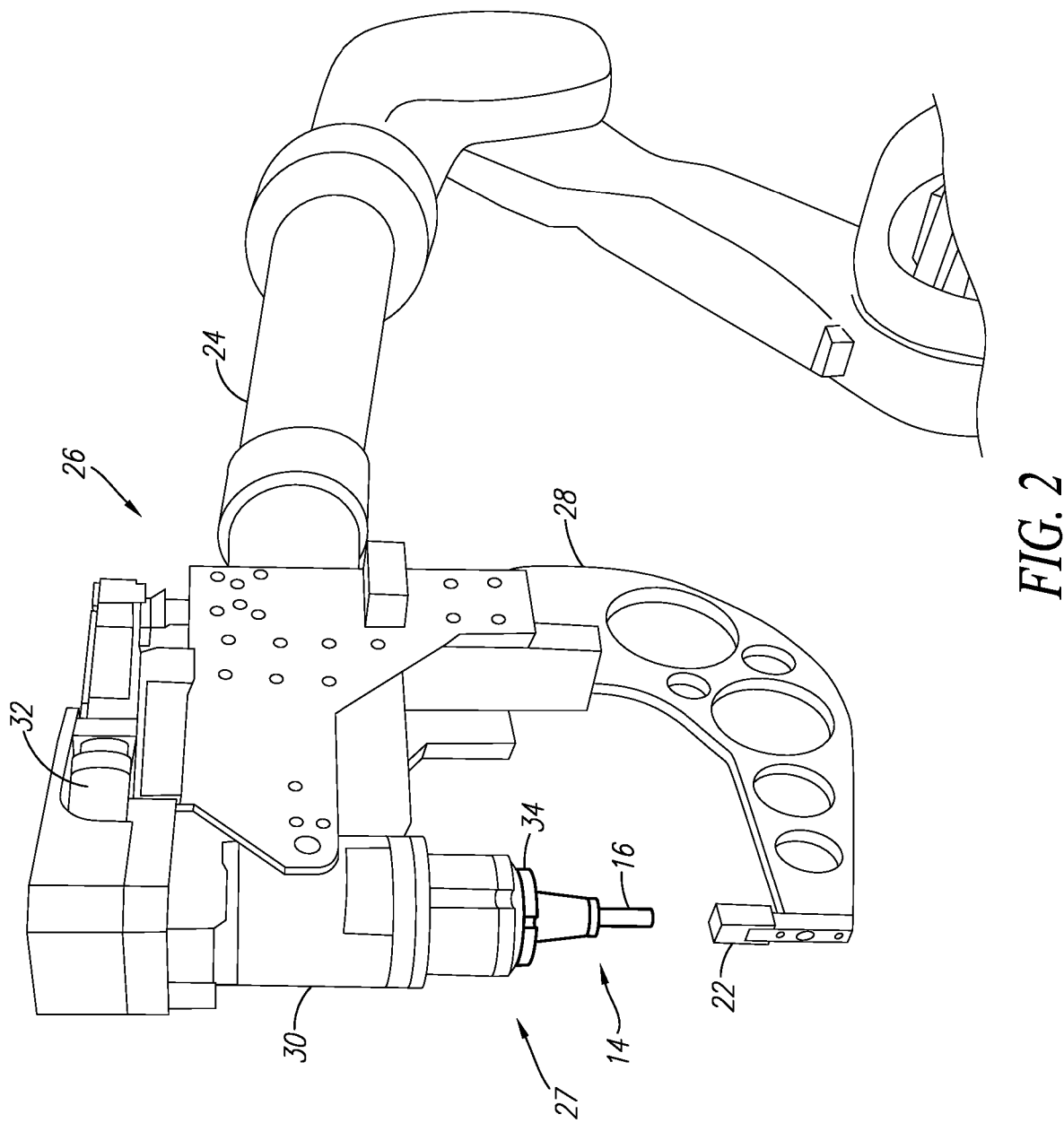
FIG. 2 shows a robot arm with a refill friction stir spot welding end effector.

FIG. 2 shows a robot arm 24 to which a refill friction stir spot welding end effector 26 is mounted. The end effector 26 includes the refill friction stir spot welding tool 14. The tool 14 is attached to a weld head 27 on the end effector 26 that includes the spindle for driving the tool. The refill friction stir spot welding tool 14 has a quick connect attachment structure, discussed below, to allow the tool to be switched out or replaced quickly, such as within two minutes instead of 20 minutes.

The end effector 26 can include an anvil arm 28 that holds the anvil 22. The anvil arm 28 supports the anvil 22 such that the anvil is aligned with the clamp 16, friction sleeve and friction pin of the tool 14 along the rotational axis R (FIG. 1) of the tool. The anvil arm 28 can have a curved shape and forms a lower jaw of the end effector 26, so that the end effector has a generally C-shaped appearance. In certain embodiments, the anvil 22 is not attached to an end effector 26, but is separate from the weld head. For example, in a gantry-style machine, the refill friction stir spot welding tool can be mounted to a weld head that is attached to a gantry, for horizontal and vertical movements, and the anvil can be attached to a movable table or other lower fixture tooling. A pedestal-style machine could also have an anvil mounted to lower fixture tooling separate from the weld head.

The end effector 26 can include various motors, such as servo motors, to control the operation of a spindle that rotates the friction sleeve and friction pin about the rotational axis R (FIG. 1) and control the axial movement of the sleeve and pin during welding. For example, the end effector 26 can include three separate servo motors that respectively drive the rotation of the spindle and the independent linear axial movements of the friction sleeve and friction pin. The servo motor 30 on the weld head 27 that rotates the spindle, and the servo motor 32 that linearly (axially) drives the friction sleeve, can be seen in FIG. 2. A servo motor similar to the servo motor 32 for the friction sleeve can be located on the opposite side of the end effector 26 for linearly (axially) driving the friction pin. The end effector 26 can further include a servo motor that opens and closes the upper and lower "jaws" of the end effector 26, to clamp the workpieces between the clamp 16 and the anvil 22. It is to be appreciated that the anvil 22 and anvil arm 28 can be driven upward toward the clamp 16 or the clamp 16 and upper structure of the end effector 26 can be driven downward toward the anvil 22.

The end effector 26 includes a clamp receiver 34 for holding the clamp 16. The friction sleeve and the friction pin are attached directly to the spindle of the end effector 26. The spindle can have an outer portion and an inner portion to which the friction sleeve and friction pin are respectively attached. The outer and inner portions of the spindle rotate and can move linearly (axially) independently from one another during the refill friction stir spot welding process. The tool 14, clamp receiver 34 and spindle provide the quick connect attachment structures discussed below, to allow the tool to be switched out or replaced quickly.

FIGS. 3 and 4 show the refill friction stir spot welding tool 14 in further detail. The clamp 16 can have a two-piece design comprising a lower clamp and an upper clamp holder 36, which gets attached to the clamp receiver on the end effector. The lower clamp can be bolted to the clamp holder 36 as shown, or attached to the clamp holder in another manner (e.g., screwed onto the clamp holder). A two-piece design can allow the lower clamp to be replaced if it becomes worn or damaged. Alternatively, the clamp 16 can have a one-piece design in which the lower clamp and clamp holder 36 are monolithically formed. The clamp holder 36 can include surface features, such as flats 38, that facilitate handling of the clamp and/or properly locating the clamp, such as within a tool storage receptacle.

Figure 6:
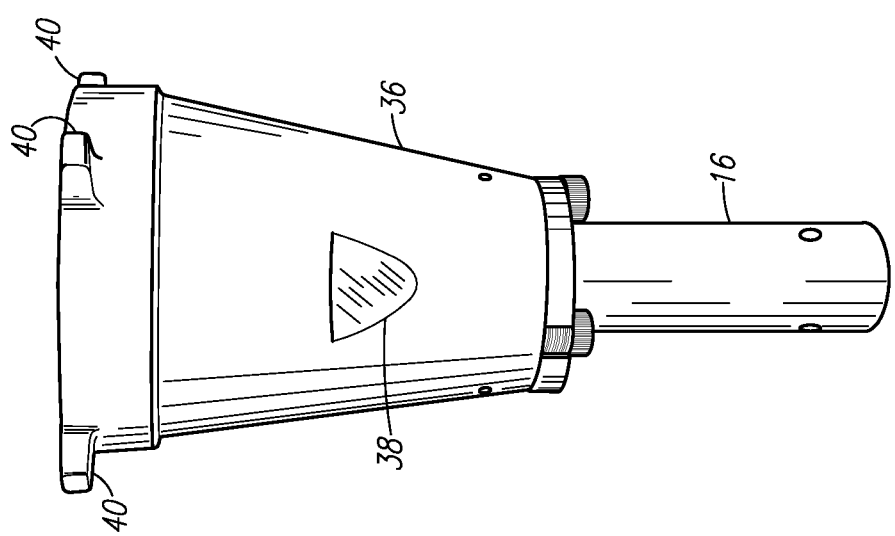
FIG. 6 shows a clamp of the refill friction stir spot welding tool.

At the top of the clamp holder 36 are a series of radially-projecting mounting tabs 40. The radially-projecting mounting tabs 40 engage mounting slots in the clamp receiver located on the end effector, to provide the quick connect/disconnect functionality of the clamp 16. In the embodiment shown in the drawings, the clamp holder 36 has four radially-projecting mounting tabs 40 symmetrically spaced at 90° intervals around the circumference of the clamp holder. However, it is to be appreciated that the clamp holder 36 can include fewer or more than four radially-projecting mounting tabs 40 and that the mounting tabs need not be symmetrically spaced around the clamp holder. The clamp 16 is attachable to and detachable from the clamp receiver on the end effector by rotations of the clamp through less than 360°. For example, the clamp 16 can be rotated clockwise through less than 360° to attach the clamp, and rotated counterclockwise through less than 360° to detach the clamp (or vice versa). In certain embodiments, the clamp 16 is attachable to and detachable from the clamp receiver by rotations of the clamp relative to the clamp receiver through less than 180°, such as via a quarter turn (90°) or less of the clamp. FIG. 6 shows the clamp 16 separate from the friction sleeve 18 and friction pin 20.

With reference to FIGS. 3 and 4, the friction sleeve 18 is located within the clamp 16 and is coaxially aligned with the clamp. The friction sleeve 18 also has radially-projecting mounting tabs 42. The radially-projecting mounting tabs 42 on the friction sleeve 18 engage mounting slots on the spindle of the end effector, to provide the quick connect/disconnect functionality of the friction sleeve. In the embodiment shown in the drawings, the friction sleeve 18 has four radially-projecting mounting tabs 42 symmetrically spaced at 90° intervals around the circumference of the friction sleeve. However, it is to be appreciated that the friction sleeve 18 can include fewer or more than four radially-projecting mounting tabs 42 and that the mounting tabs need not be symmetrically spaced around the friction sleeve. The friction sleeve 18 can have a different number of radially-projecting mounting tabs than the clamp 16, and the shape and/or configuration of the mounting tabs 42 on the friction sleeve 18 can differ from the mounting tabs 40 on the clamp 16. The friction sleeve 18 is attachable to and detachable from the spindle on the end effector by rotations of the friction sleeve through less than 360°. For example, the friction sleeve 18 can be rotated clockwise through less than 360° to attach the friction sleeve, and rotated counterclockwise through less than 360° to detach the friction sleeve (or vice versa). In certain embodiments, the friction sleeve 18 is attachable to and detachable from the spindle on the end effector by rotations of the friction sleeve relative to the spindle through less than 180°, such as via a quarter turn (90°) or less of the friction sleeve. It can be seen that the radially-projecting mounting tabs 42 on the friction sleeve 18 are located at a different axial location along the rotational axis R of the tool 14 than the radially-projecting mounting tabs 40 on the clamp 16. For example, the radially-projecting mounting tabs 42 on the friction sleeve 18 are located higher along the axis R of the tool 14 than the mounting tabs 40 on the clamp 16. The radially-projecting mounting tabs 42 on the friction sleeve 18 are also located radially inward of the mounting tabs 40 on the clamp 16.

Figure 7:
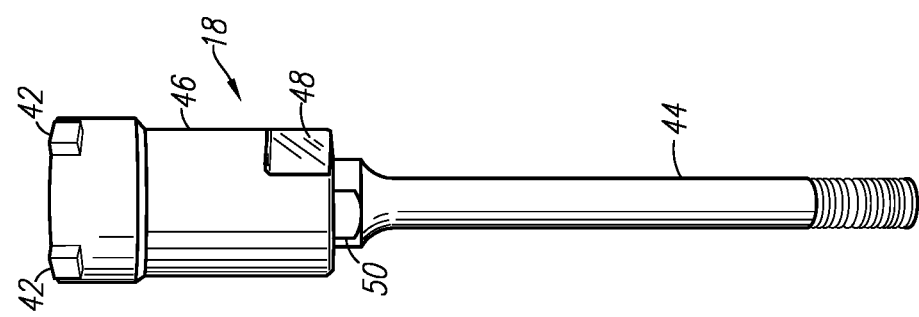
FIG. 7 shows a friction sleeve of the refill friction stir spot welding tool.

FIG. 7 shows the friction sleeve 18 separate from the clamp 16 and friction pin 20. The friction sleeve 18 can have a two-piece design comprising a lower sleeve 44 and an upper sleeve holder 46. The sleeve holder 46 includes the radially-projecting mounting tabs 42 and will be attached to the spindle on the end effector. The lower sleeve 44 can be threaded into the sleeve holder 46, or attached to the sleeve holder in another fashion. A two-piece design can allow the lower sleeve 44 to be replaced if it becomes worn or damaged. Alternatively, the friction sleeve 18 can have a one-piece design in which the lower sleeve 44 and sleeve holder 46 are monolithically formed. The upper sleeve holder 46 has a larger diameter than the lower sleeve 44. The upper sleeve holder 46 can include surface features, such as flats 48, that facilitate handling of the friction sleeve 18 and/or properly locating the friction sleeve, such as within a tool storage receptacle. The lower sleeve 44 can also include surface features, such as flats 50, that can help a tool grip the lower sleeve when it is threaded into the upper sleeve holder 46.

Figure 8:
FIG. 8 shows a friction pin of the refill friction stir spot welding tool.

With reference to FIGS. 3, 4 and 8, the friction pin 20 is located within the friction sleeve 18 and, thus, within the clamp 16. The friction pin 20 is coaxially aligned with the clamp 16 and the friction sleeve 18 along the rotational axis R of the tool 14. In the embodiment shown, the friction pin 20 has a stadium-shaped or obround mounting head 52 located at the proximal or top end of the pin. For example, the central portion of the mounting head 52 having longer sides is rectangular, and the shorter ends of the mounting head are semicircular when viewed axially along the friction pin 20. The stadium shape of the mounting head 52 matches a similarly-shaped opening or mounting slot in the inner portion of the spindle. The stadium-shaped mounting head 52 is attached to the main body of the friction pin 20 by a short neck portion 54. The friction pin 20 is captured by the inner portion of the spindle via the neck portion 54 and, prior to clamping/welding workpieces, is suspended from the spindle by the stadium-shaped mounting head 52. It is to be appreciated that the mounting head 52 could have various shapes, such as a rectangular shape for example.

The friction pin 20 is attachable to and detachable from the spindle on the end effector by rotations of the friction pin through less than 360°. For example, the friction pin 20 can be rotated clockwise through less than 360° to attach the friction pin, and rotated counterclockwise through less than 360° to detach the friction pin (or vice versa). In certain embodiments, the friction pin 20 is attachable to and detachable from the spindle by rotations of the friction pin relative to the spindle through less than 180°, such as via a quarter turn 90° or less of the friction pin. It can be seen that the stadium-shaped mounting head 52 on the friction pin 20 is located at a different axial location along the rotational axis R of the tool 14 than the radially-projecting mounting tabs on the clamp 16 and friction sleeve 18. For example, the stadium-shaped mounting head 52 is located higher along the axis R of the tool 14 than the mounting tabs 40, 42 on the clamp 16 and friction sleeve 18. The stadium-shaped mounting head 52 is also located radially inward of the mounting tabs 40, 42 on the clamp 16 and friction sleeve 18.

It can be seen in FIGS. 3, 4 and 6-8 that the friction pin 20 is longer than the friction sleeve 18, and that the friction sleeve is longer than the clamp 16. In certain embodiments, the refill friction stir spot welding tool 14 is water cooled. The clamp holder 36 can include sealed water apertures or fittings 58 (FIG. 4) for conveying cooling water received from the end effector.

Figure 5:
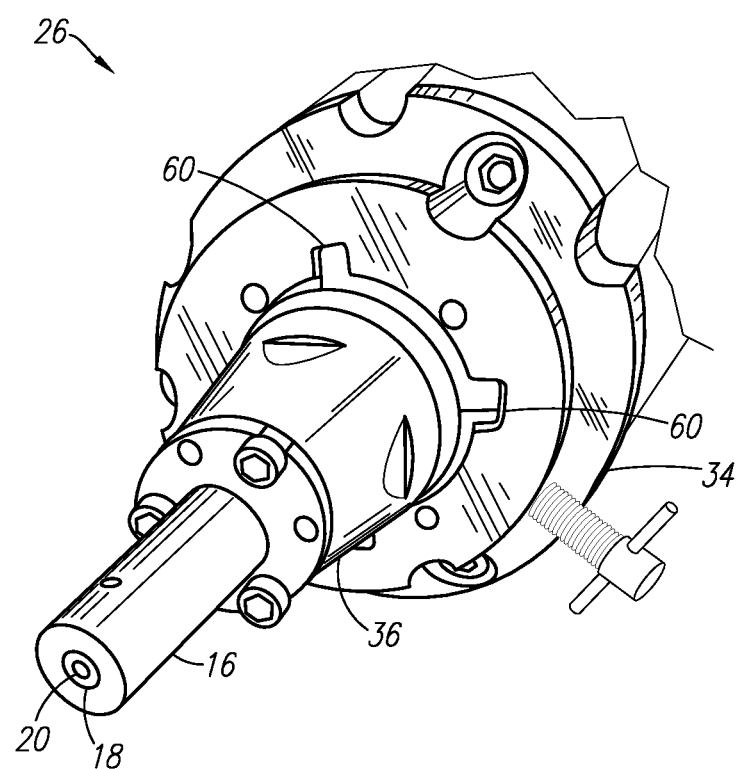
FIG. 5 shows a portion of the refill friction stir spot welding end effector.

FIG. 5 provides a perspective view of a portion of the end effector 26 looking toward the distal end of the refill friction stir spot welding tool 14. The friction sleeve 18 and friction pin 20 can be seen flush with the distal end of the clamp 16. The clamp holder 36 is attached to the clamp receiver 34 on the end effector 26 via mounting slots 60 on the clamp receiver.

Figure 9:
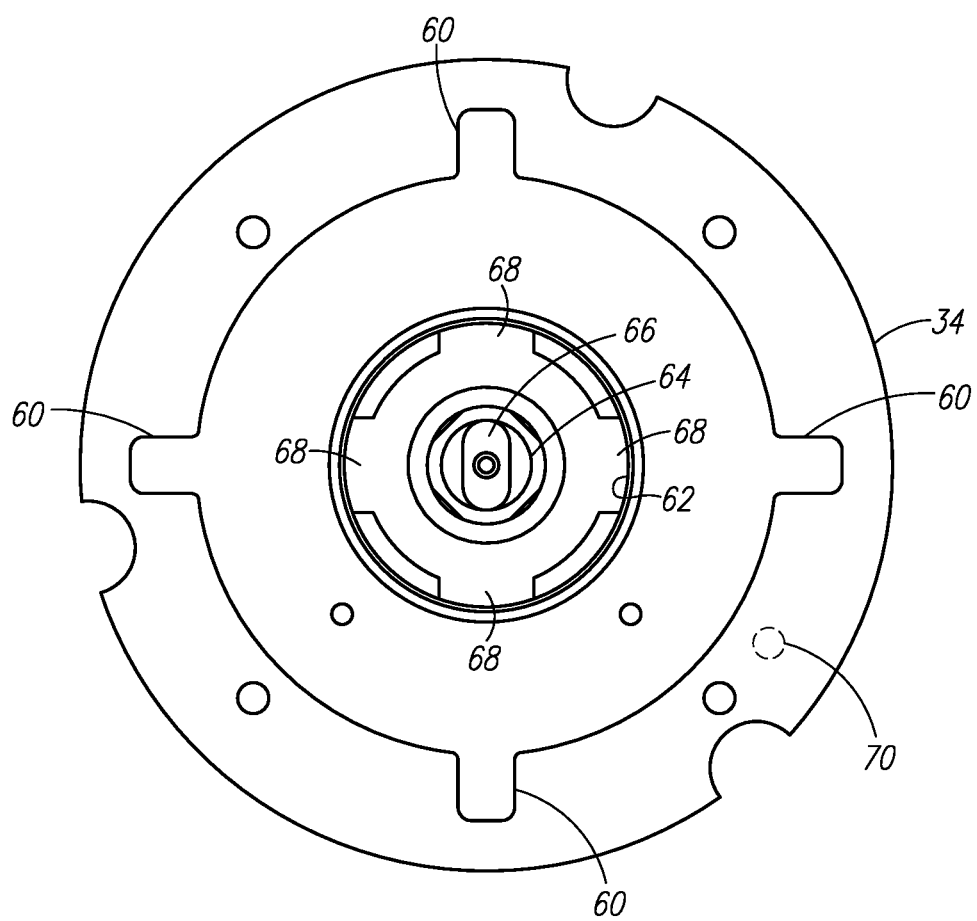
FIG. 9 shows a portion of the refill friction stir spot welding end effector.
Figure 10:
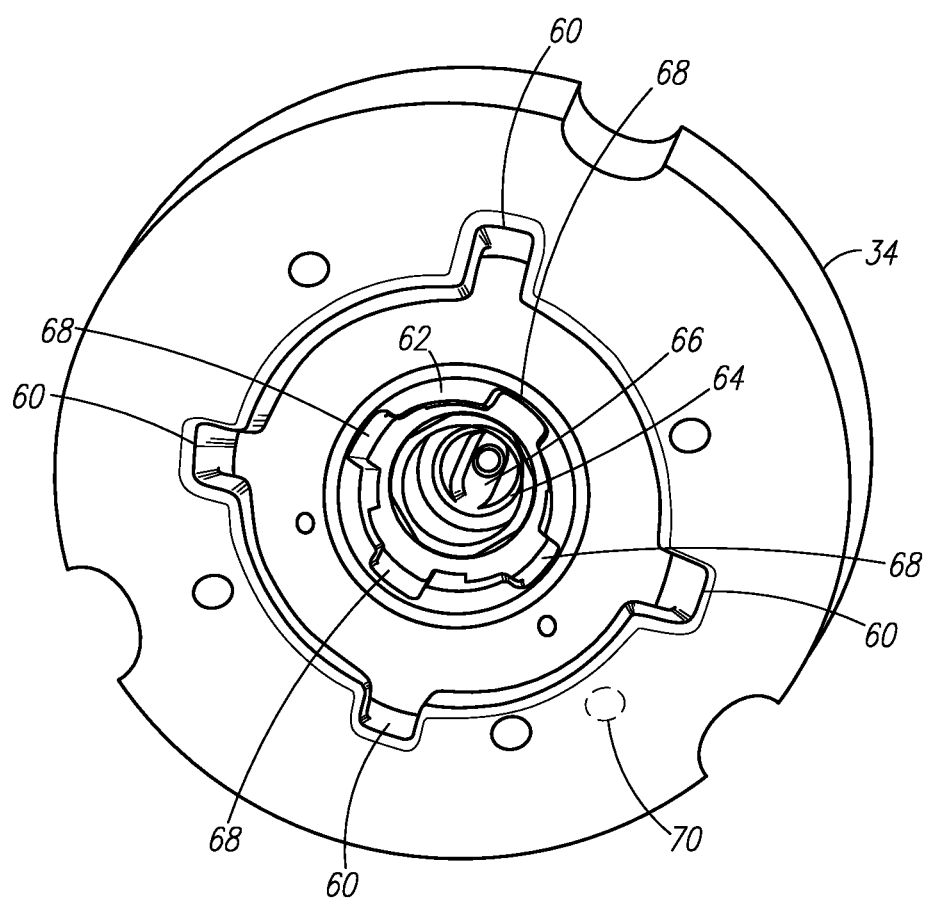
FIG. 10 shows a portion of the refill friction stir spot welding end effector.

FIGS. 9 and 10 show the clamp receiver 34 and spindle of end effector's weld head. The spindle has an outer portion 62 that holds and drives the friction sleeve, and an inner portion 64 that holds and drives the friction pin. The portions 62, 64 of the spindle rotate in the same direction during refill friction stir spot welding; however, they are independently linearly movable back and forth along the rotational axis of the spindle by servo motors on the end effector. The inner portion 64 of the spindle has a stadium-shaped slot 66 for receiving the stadium-shaped mounting head of the friction pin. The mounting head of the friction pin is inserted into the stadium-shaped slot 66 and the pin is rotated and captured around its neck portion. The outer portion 62 of the spindle has mounting slots 68 for receiving the radially-projecting tabs on the friction sleeve. There are an equal number of mounting slots 68 as there are mounting tabs on the friction sleeve. The mounting slots 68 have an axial portion that leads to a circumferential portion, so that the friction sleeve can be inserted axially into the outer portion 62 of the spindle and rotated relative to the spindle. Prior to performing a welding operation, the friction sleeve is suspended from the spindle via its mounting tabs resting on the circumferential portions of the mounting slots 68. The spindle rotates in one direction, which serves to keep the friction sleeve and friction pin in place without an additional locking mechanism. However, if desired, such a locking mechanism can be provided (e.g., a selectively deployable pin, such as a shot pin). The circumferential portion of the slot 68 can include a mechanical stop to limit the rotation of the friction sleeve relative to the spindle.

The clamp receiver 34 also has mounting slots 60 having an axial portion that leads to a circumferential portion, so that the clamp can be inserted axially into the clamp receiver 34 and rotated relative to the clamp receiver. The circumferential portion of the slot can be in the form of a shelf that supports the clamp via the clamp's radially-projecting mounting tabs. The circumferential portion of the slot 60 can include mechanical stops to limit the rotation of the clamp relative to the clamp receiver 34. There are an equal number of mounting slots 60 as there are mounting tabs on the clamp. The clamp receiver 34 does not rotate. To help lock the clamp in place, the end effector can include a locking mechanism 70 (e.g., a selectively deployable pin, such as a shot pin) that prevents the clamp from rotating or backing out of the mounting slots 60 once in place. The locking mechanism 70 can also help to rotationally orient the clamp and/or the friction sleeve within the weld head.

In certain embodiments, the friction pin, friction sleeve and clamp can be provided together as a kit, either as an assembled tool or as separate components for later assembly. In certain embodiments, the friction pin, friction sleeve and clamp can be installed on the weld head simultaneously. The friction pin, friction sleeve and clamp can also be installed one at a time, e.g., with the friction sleeve slid over the already—mounted friction pin, and the clamp then installed over the friction sleeve. The friction pin, friction sleeve and clamp can be installed manually or automatically by the robot arm. Although a tab-and-slot quick connect mounting system has been described above, it is to be appreciated that other quick connect mounting systems could be employed on a refill friction stir spot welding tool. For example, ball lock quick connects could be provided for attaching/detaching the friction pin, the friction sleeve and/or the clamp to the end effector. Ball lock quick connects could include biased captive balls within the weld head that are radially movable to capture the components of the refill friction stir spot welding tool as the components are axially translated relative to the weld head. For example, the captive balls could engage concave slots on the tool components to attach them to the weld head.

The quick connect refill friction stir spot welding tool has been discussed above in detail in the context of an end effector mounted to a robot arm. However, it is to be appreciated that the quick connect tool could also be used in other types of refill friction stir spot machines, such as gantry-style machines and pedestal-style machines for example.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A quick connect refill friction stir spot welding tool, comprising:
   a clamp comprising a first radially-projecting mounting tab configured for engaging a first mounting slot in a refill friction stir spot welding weld head;
   a friction sleeve located coaxially within the clamp and comprising a second radially-projecting mounting tab configured for engaging a second mounting slot in the refill friction stir spot welding weld head, wherein the second radially-projecting mounting tab is located higher along an axis of the tool than the first radially-projecting mounting tab, and radially inward thereof; and
   a friction pin located coaxially within the clamp and friction sleeve,
   wherein the clamp is attachable to the refill friction stir spot welding weld head by rotation of the clamp through less than 360 degrees, and detachable from the refill friction stir spot welding weld head by another rotation of the clamp through less than 360 degrees, and
   wherein the friction sleeve is attachable to the refill friction stir spot welding weld head by rotation of the friction sleeve through less than 360 degrees, and detachable from the refill friction stir spot welding weld head by another rotation of the friction sleeve through less than 360 degrees.

2. The quick connect refill friction stir spot welding tool of claim 1, wherein the friction pin includes an obround mounting head at one end of the friction pin.

3. The quick connect refill friction stir spot welding tool of claim 2, wherein the friction pin is attachable to the refill friction stir spot welding weld head by rotation of the friction pin relative to a spindle of the refill friction stir spot welding weld head through less than 180 degrees.

4. The quick connect refill friction stir spot welding tool of claim 1, wherein the clamp and the friction sleeve each include a plurality of radially-projecting mounting tabs.

5. The quick connect refill friction stir spot welding tool of claim 4, wherein the clamp and the friction sleeve each have four symmetrically-spaced radially-projecting mounting tabs.

6. The quick connect refill friction stir spot welding tool of claim 1, wherein the friction pin includes an obround mounting portion for attaching the friction pin to a spindle of the refill friction stir spot welding weld head.

7. The quick connect refill friction stir spot welding tool of claim 1, wherein the friction sleeve comprises:
   a sleeve holder; and
   a sleeve threaded into sleeve holder, wherein the second radially-projecting mounting tab is located on the sleeve holder.

8. The quick connect refill friction stir spot welding tool of claim 1, wherein the clamp is attachable to the refill friction stir spot welding weld head by rotation of the clamp through less than 180 degrees and detachable from the refill friction stir spot welding weld head by another rotation of the clamp through less than 180 degrees, and wherein the friction sleeve is attachable to the refill friction stir spot welding weld head by rotation of the friction sleeve through less than 180 degrees and detachable from the refill friction stir spot welding weld head by another rotation of the friction sleeve through less than 180 degrees.

9. A quick connect robotic refill friction stir spot welding tool, comprising:
   a clamp comprising a first plurality of radially-projecting mounting tabs configured for engaging clamp mounting slots in a clamp receiver of a refill friction stir spot welding end effector;
   a friction sleeve located coaxially within the clamp and comprising a second plurality of radially-projecting mounting tabs configured for engaging friction sleeve mounting slots in a spindle of the refill friction stir spot welding end effector, wherein the second plurality of radially-projecting mounting tabs are located at a different axial location along an axis of the tool than the first plurality of radially-projecting mounting tabs, and radially inward thereof; and
   a friction pin located coaxially within the clamp and friction sleeve and comprising an obround mounting head receivable by the spindle of the refill friction stir spot welding end effector,
   wherein the clamp is attachable to the refill friction stir spot welding end effector by rotation of the clamp relative to the clamp receiver through less than 180 degrees, and detachable from the refill friction stir spot welding end effector by another rotation of the clamp relative to the clamp receiver through less than 180 degrees, and
   wherein the friction sleeve is attachable to from the refill friction stir spot welding end effector by rotation of the friction sleeve relative to the spindle through less than 180 degrees, and detachable from the refill friction stir spot welding end effector by another rotation of the friction sleeve relative to the spindle through less than 180 degrees, and
   wherein the friction pin is attachable to the refill friction stir spot welding end effector by rotation of the friction pin relative to the spindle through less than 180 degrees, and detachable from the refill friction stir spot welding end effector by another rotation of the friction pin relative to the spindle through less than 180 degrees.

10. The quick connect robotic refill friction stir spot welding tool of claim 9, wherein the obround mounting head is located at a different axial location along the axis of the tool than the second plurality of radially-projecting mounting tabs, and radially inward thereof.

11. The quick connect robotic refill friction stir spot welding tool of claim 10, wherein the friction sleeve comprises:
   a sleeve holder; and
   a sleeve threaded into sleeve holder, wherein the second plurality of radially-projecting mounting tabs are located on the sleeve holder.

12. The quick connect robotic refill friction stir spot welding tool of claim 10, wherein the clamp and the friction sleeve each have four symmetrically-spaced radially-projecting mounting tabs.

13. A refill friction stir spot welding end effector for a robot arm, comprising:
   a spindle;
   a clamp receiver mounted coaxially with the spindle;
   a clamp comprising a first radially-projecting mounting tab that engages a clamp mounting slot in the clamp receiver;
   a friction sleeve located within the clamp and comprising a second radially-projecting mounting tab that engages a friction sleeve mounting slot in the spindle, wherein the second radially-projecting mounting tab is located at a different axial location along a rotational axis of the spindle than the first radially-projecting mounting tab, and radially inward thereof;

a friction pin located within the friction sleeve and attached to the spindle; and an anvil arm supporting an anvil aligned with the clamp, the friction sleeve, and the friction pin along the rotational axis of the spindle, wherein:

the friction sleeve and the friction pin are operatively coupled to the spindle for rotation by the spindle, the friction sleeve and the friction pin are independently linearly movable along the rotational axis of the spindle during a refill friction stir spot welding operation, the clamp is attachable to the clamp receiver by rotation of the clamp relative to the clamp receiver through less than 180 degrees, and detachable from the clamp receiver by another rotation of the clamp relative to the clamp receiver through less than 180 degrees, the friction sleeve is attachable to the spindle by rotation of the friction sleeve relative to the spindle through less than 180 degrees, and detachable from the spindle by another rotation of the friction sleeve relative to the spindle through less than 180 degrees, and the friction pin is attachable to the spindle by rotation of the friction pin relative to the spindle through less than 180 degrees, and detachable from the spindle by another rotation of the friction pin relative to the spindle through less than 180 degrees.

14. The refill friction stir spot welding end effector for a robot arm of claim 13, wherein the friction pin includes an obround mounting head at one end of the friction pin.

15. The refill friction stir spot welding end effector for a robot arm of claim 14, wherein the stadium-shaped mounting head is located at a different axial location along the rotational axis of the spindle than the second radially-projecting mounting tab, and radially inward thereof.

16. The refill friction stir spot welding end effector for a robot arm of claim 15, wherein the clamp and the friction sleeve each have four symmetrically-spaced radially-projecting mounting tabs.

17. The refill friction stir spot welding end effector for a robot arm of claim 13, wherein the clamp and the friction sleeve each include a plurality of radially-projecting mounting tabs.

18. The refill friction stir spot welding end effector for a robot arm of claim 13, wherein the friction pin includes an obround mounting portion for attaching the friction pin to the spindle.

19. The refill friction stir spot welding end effector for a robot arm of claim 13, wherein the friction sleeve comprises:

a sleeve holder; and a sleeve threaded into sleeve holder, wherein the second radially-projecting mounting tab is located on the sleeve holder.

20. A kit for a quick connect refill friction stir spot welding tool, comprising:

a clamp comprising a first radially-projecting mounting tab configured for engaging a first mounting slot in a refill friction stir spot welding weld head;

a friction sleeve configured for emplacement coaxially within the clamp and comprising a second radially-projecting mounting tab configured for engaging a second mounting slot in the refill friction stir spot welding weld head, wherein the second radially-projecting mounting tab is locatable at a different axial location along an axis of the tool than the first radially-projecting mounting tab, and radially inward thereof, when the friction sleeve is emplaced within the clamp; and a friction pin configured for emplacement coaxially within the clamp and friction sleeve, wherein the clamp is attachable to the refill friction stir spot welding weld head by rotation of the clamp through less than 360 degrees, and detachable from the refill friction stir spot welding weld head by another rotation of the clamp through less than 360 degrees, and wherein the friction sleeve is attachable to the refill friction stir spot welding weld head by rotation of the friction sleeve through less than 360 degrees, and detachable from the refill friction stir spot welding weld head by another rotation of the friction sleeve through less than 360 degrees.

21. The kit for a quick connect refill friction stir spot welding tool of claim 20, wherein the friction pin includes an obround mounting head at one end of the friction pin.

* * * * *